(12) United States Patent  (10) Patent No.: US 7,828,652 B2
Nguyen et al.  (45) Date of Patent: Nov. 9, 2010

(54) PLAYER VERIFICATION METHOD AND SYSTEM FOR REMOTE GAMING TERMINALS

(75) Inventors: Binh T. Nguyen, Reno, NV (US); Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 1050 days.

(21) Appl. No.: 10/708,168

(22) Filed: Feb. 12, 2004

(65) Prior Publication Data

US 2005/0181870 A1    Aug. 18, 2005

(51) Int. Cl.
*A63F 13/00* (2006.01)
*A63F 13/12* (2006.01)
(52) U.S. Cl. .............................. 463/29; 463/39; 463/40; 463/42; 705/64; 705/67; 705/72; 705/78; 709/203; 713/155; 713/170; 713/176; 713/186; 902/2; 902/3; 902/23; 902/40
(58) Field of Classification Search ............. 463/16–23, 463/25–33, 39–43, 47; 273/138.1, 139, 138.2, 273/141 A, 454–456, 460; 713/1, 100, 150, 713/300, 375, 400, 500, 600, 155, 170, 176, 713/182–184, 186–189; 705/56–57, 64, 705/67, 72, 74–75, 78–79; 902/2–3, 23, 902/38, 40; 709/203–207, FOR. 113
See application file for complete search history.

(56) References Cited

U.S. PATENT DOCUMENTS 4,467,424 A * 8/1984 Hedges et al. ................ 463/26
4,481,670 A * 11/1984 Freeburg ..................... 455/69
4,575,622 A * 3/1986 Pellegrini .................... 463/25
5,056,141 A   10/1991 Dyke (Continued)

FOREIGN PATENT DOCUMENTS

DE    199 22 862 A1    12/2000

(Continued)

OTHER PUBLICATIONS

PCT International Search Report, Jun. 6, 2005.

(Continued)

*Primary Examiner*—Peter DungBa Vo
*Assistant Examiner*—Arthur O. Hall
(74) *Attorney, Agent, or Firm*—Weaver Austin Villeneuve & Sampson LLP

(57) ABSTRACT

Various methods and systems for providing a reliable verification of a player at a remote gaming terminal are disclosed. This is done by providing gaming events remotely via a first mode of communication, establishing criteria for verifying the identity of a player, receiving a player request to participate in a gaming event remotely, obtaining personal information for that player via a second mode of communication, verifying that the obtained personal information is adequate, and permitting the requested gaming event to commence. Additional features can include a subsequent repetition of the steps of obtaining and verifying personal information, and permitting the gaming event to commence or continue. Personal information can include pictures and/or the geographic location of the player. A cellular telephone can be used to take pictures and determine the geographic location of the player, and both of these items can be transmitted via a cellular telephone call.

39 Claims, 6 Drawing Sheets

U.S. PATENT DOCUMENTS

| | | | |
|---|---|---|---|
| 5,128,980 A * | 7/1992 | Choi | 340/7.39 |
| 5,153,918 A * | 10/1992 | Tuai | 713/182 |
| 5,192,076 A | 3/1993 | Komori | |
| 5,229,764 A * | 7/1993 | Matchett et al. | 340/5.52 |
| 5,265,864 A | 11/1993 | Roux et al. | |
| 5,265,874 A | 11/1993 | Dickinson et al. | |
| 5,280,527 A * | 1/1994 | Gullman et al. | 713/184 |
| 5,287,269 A * | 2/1994 | Dorrough et al. | 705/17 |
| 5,326,104 A | 7/1994 | Pease et al. | |
| 5,429,361 A | 7/1995 | Raven et al. | |
| 5,459,458 A * | 10/1995 | Richardson et al. | 340/825.52 |
| 5,473,671 A * | 12/1995 | Partridge, III | 455/445 |
| 5,475,738 A * | 12/1995 | Penzias | 379/88.14 |
| 5,505,449 A | 4/1996 | Eberhardt et al. | |
| 5,509,053 A * | 4/1996 | Gowda et al. | 455/465 |
| 5,586,936 A | 12/1996 | Bennett et al. | |
| 5,618,232 A * | 4/1997 | Martin | 463/25 |
| 5,736,727 A | 4/1998 | Nakata et al. | |
| 5,742,905 A * | 4/1998 | Pepe et al. | 455/461 |
| 5,755,621 A | 5/1998 | Marks et al. | |
| 5,761,647 A | 6/1998 | Boushy | |
| 5,762,552 A | 6/1998 | Vuong et al. | |
| 5,764,789 A * | 6/1998 | Pare et al. | 382/115 |
| 5,766,076 A | 6/1998 | Pease et al. | |
| 5,768,382 A | 6/1998 | Schneier et al. | |
| 5,770,533 A | 6/1998 | Franchi | |
| 5,795,228 A | 8/1998 | Trumbull et al. | |
| 5,800,268 A | 9/1998 | Molnick | |
| 5,833,536 A | 11/1998 | Davids et al. | |
| 5,851,148 A | 12/1998 | Brune et al. | |
| 5,851,149 A | 12/1998 | Xidos et al. | |
| 5,865,470 A | 2/1999 | Thompson | |
| 5,869,822 A | 2/1999 | Meadows, II et al. | |
| 5,871,398 A | 2/1999 | Schneier et al. | |
| 5,878,211 A | 3/1999 | Delagrange | |
| 5,879,453 A | 3/1999 | Streeter et al. | |
| 5,889,474 A | 3/1999 | LaDue | |
| 5,902,983 A | 5/1999 | Crevelt et al. | |
| 5,903,881 A | 5/1999 | Schrader et al. | |
| 5,920,640 A | 7/1999 | Salatino et al. | |
| 5,951,397 A | 9/1999 | Dickinson | |
| 5,954,583 A | 9/1999 | Green | |
| 5,970,143 A | 10/1999 | Schneier et al. | |
| 5,991,431 A | 11/1999 | Borza et al. | |
| 5,995,630 A | 11/1999 | Borza | |
| 5,999,808 A * | 12/1999 | LaDue | 455/412.2 |
| 6,001,016 A * | 12/1999 | Walker et al. | 463/42 |
| 6,003,013 A | 12/1999 | Boushy et al. | |
| 6,003,014 A * | 12/1999 | Lee et al. | 705/13 |
| 6,010,404 A | 1/2000 | Walker et al. | |
| 6,012,636 A | 1/2000 | Smith | |
| 6,023,688 A * | 2/2000 | Ramachandran et al. | 705/44 |
| 6,027,115 A | 2/2000 | Griswold et al. | |
| 6,039,648 A | 3/2000 | Guinn et al. | |
| 6,048,269 A | 4/2000 | Burns et al. | |
| 6,098,985 A | 8/2000 | Moody | |
| 6,099,408 A | 8/2000 | Schneier et al. | |
| 6,104,815 A * | 8/2000 | Alcorn et al. | 380/251 |
| 6,117,011 A | 9/2000 | Lvov | |
| 6,128,660 A | 10/2000 | Grimm et al. | |
| 6,135,884 A | 10/2000 | Hedrick et al. | |
| 6,142,876 A | 11/2000 | Cumbers | |
| 6,148,094 A | 11/2000 | Kinsella | |
| 6,149,062 A | 11/2000 | Danielson et al. | |
| 6,157,966 A | 12/2000 | Montgomery et al. | |
| 6,178,255 B1 | 1/2001 | Scott et al. | |
| 6,178,510 B1 | 1/2001 | O'Connor et al. | |
| 6,183,366 B1 | 2/2001 | Goldberg et al. | |
| 6,190,257 B1 * | 2/2001 | Takeda et al. | 463/29 |
| 6,193,153 B1 | 2/2001 | Lambert | |
| 6,196,920 B1 | 3/2001 | Spaur et al. | |
| 6,213,403 B1 | 4/2001 | Bates, III | |
| 6,219,439 B1 | 4/2001 | Burger | |
| 6,234,900 B1 * | 5/2001 | Cumbers | 463/29 |
| 6,244,957 B1 | 6/2001 | Walker et al. | |
| 6,264,557 B1 * | 7/2001 | Schneier et al. | 463/29 |
| 6,264,560 B1 | 7/2001 | Goldberg et al. | |
| 6,280,325 B1 | 8/2001 | Fisk | |
| 6,307,956 B1 | 10/2001 | Black | |
| 6,325,285 B1 | 12/2001 | Baratelli | |
| 6,325,292 B1 | 12/2001 | Sehr | |
| 6,327,376 B1 | 12/2001 | Harkin | |
| 6,332,193 B1 * | 12/2001 | Glass et al. | 713/170 |
| 6,363,485 B1 | 3/2002 | Adams et al. | |
| 6,409,602 B1 | 6/2002 | Wiltshire et al. | |
| 6,425,828 B2 | 7/2002 | Walker et al. | |
| 6,508,709 B1 * | 1/2003 | Karmarkar | 463/42 |
| 6,508,710 B1 | 1/2003 | Paravia et al. | |
| 6,527,638 B1 | 3/2003 | Walker et al. | |
| 6,554,705 B1 * | 4/2003 | Cumbers | 463/29 |
| 6,604,085 B1 * | 8/2003 | Kolls | 705/14 |
| 6,612,928 B1 * | 9/2003 | Bradford et al. | 463/29 |
| 6,636,620 B1 | 10/2003 | Hoshino | |
| 6,676,522 B2 * | 1/2004 | Rowe et al. | 463/42 |
| 6,709,333 B1 | 3/2004 | Bradford et al. | |
| 6,766,946 B2 * | 7/2004 | Iida et al. | 235/381 |
| 6,846,238 B2 * | 1/2005 | Wells | 463/39 |
| 6,950,940 B2 * | 9/2005 | Wheeler et al. | 713/182 |
| 6,979,264 B2 | 12/2005 | Chatigny et al. | |
| 6,980,670 B1 * | 12/2005 | Hoffman et al. | 382/115 |
| 6,984,175 B2 | 1/2006 | Nguyen et al. | |
| 7,107,245 B1 * | 9/2006 | Kowalick | 705/44 |
| 7,125,335 B2 * | 10/2006 | Rowe | 463/25 |
| 7,260,834 B1 * | 8/2007 | Carlson | 726/4 |
| 7,285,048 B2 * | 10/2007 | Karmarkar | 463/42 |
| 7,303,473 B2 | 12/2007 | Rowe | |
| 7,506,172 B2 | 3/2009 | Bhakta | |
| 7,606,560 B2 * | 10/2009 | Labrou et al. | 455/411 |
| 7,637,810 B2 | 12/2009 | Amaitis et al. | |
| 7,644,861 B2 | 1/2010 | Alderucci et al. | |
| 7,690,043 B2 * | 3/2010 | Saunders et al. | 726/27 |
| 7,702,807 B2 * | 4/2010 | Morita | 709/238 |
| 2001/0011680 A1 * | 8/2001 | Soltesz et al. | 235/379 |
| 2001/0018660 A1 * | 8/2001 | Sehr | 705/5 |
| 2002/0034975 A1 | 3/2002 | Walker et al. | |
| 2002/0047905 A1 * | 4/2002 | Kinjo | 348/207 |
| 2002/0082084 A1 | 6/2002 | Snow et al. | |
| 2002/0111213 A1 * | 8/2002 | McEntee et al. | 463/42 |
| 2002/0132663 A1 * | 9/2002 | Cumbers | 463/25 |
| 2002/0142844 A1 * | 10/2002 | Kerr | 463/42 |
| 2002/0143991 A1 | 10/2002 | Chow | |
| 2002/0147047 A1 * | 10/2002 | Letovsky et al. | 463/42 |
| 2002/0151363 A1 * | 10/2002 | Letovsky et al. | 463/40 |
| 2002/0155887 A1 | 10/2002 | Criss-Puszkiewicz et al. | |
| 2002/0160834 A1 * | 10/2002 | Urie et al. | 463/29 |
| 2002/0169021 A1 * | 11/2002 | Urie et al. | 463/25 |
| 2002/0184500 A1 | 12/2002 | Maritzen et al. | |
| 2003/0006931 A1 * | 1/2003 | Mages | 342/357.06 |
| 2003/0017871 A1 | 1/2003 | Urie et al. | |
| 2003/0031321 A1 * | 2/2003 | Mages | 380/270 |
| 2003/0032486 A1 | 2/2003 | Elliott | |
| 2003/0045353 A1 | 3/2003 | Paulsen et al. | |
| 2003/0054878 A1 | 3/2003 | Benoy et al. | |
| 2003/0070100 A1 | 4/2003 | Winkler | |
| 2003/0092489 A1 * | 5/2003 | Veradej | 463/36 |
| 2003/0100372 A1 * | 5/2003 | Gatto et al. | 463/42 |
| 2003/0108227 A1 | 6/2003 | Philomin et al. | |
| 2003/0131265 A1 | 7/2003 | Bhakta | |
| 2003/0139190 A1 * | 7/2003 | Steelberg et al. | 455/456 |
| 2003/0162594 A1 | 8/2003 | Rowe | |
| 2003/0228898 A1 | 12/2003 | Rowe | |
| 2004/0035926 A1 | 2/2004 | Orus et al. | |
| 2004/0053692 A1 * | 3/2004 | Chatigny et al. | 463/36 |
| 2004/0192438 A1 * | 9/2004 | Wells et al. | 463/29 |

| | | | |
|---|---|---|---|
| 2004/0192442 | A1 | 9/2004 | Wells et al. |
| 2005/0005127 | A1* | 1/2005 | Rowe et al. .................. 713/182 |
| 2005/0043096 | A1 | 2/2005 | Kerr |
| 2005/0130728 | A1 | 6/2005 | Nguyen et al. |
| 2005/0197190 | A1 | 9/2005 | Amaitis et al. |
| 2005/0233811 | A1* | 10/2005 | Gatto et al. .................... 463/42 |
| 2006/0095790 | A1 | 5/2006 | Nguyen et al. |
| 2006/0100012 | A1 | 5/2006 | Chatigny |
| 2006/0205497 | A1 | 9/2006 | Wells |
| 2006/0224890 | A1 | 10/2006 | Zhou et al. |
| 2007/0050213 | A1 | 3/2007 | Matsushima et al. |
| 2008/0214261 | A1 | 9/2008 | Alderucci |

FOREIGN PATENT DOCUMENTS

| | | |
|---|---|---|
| DE | 199 44 140 A1 | 3/2001 |
| DE | 199 52 691 | 5/2001 |
| DE | 199 52 692 | 5/2001 |
| DE | 100 60 079 | 6/2002 |
| EP | 1 045 346 | 10/2000 |
| EP | 1 063 622 | 12/2000 |
| EP | 1 120 757 | 8/2001 |
| EP | 1 231 577 | 8/2002 |
| EP | 1 606 777 | 12/2005 |
| JP | 2001-212363 | 8/2001 |
| RU | 2102790 | 1/1998 |
| RU | 2124753 | 1/1999 |
| RU | 2147847 | 4/2000 |
| RU | 2186584 | 8/2002 |
| RU | 2190477 | 10/2002 |
| RU | 2195699 (C2) | 12/2002 |
| WO | WO 93-10508 | 5/1993 |
| WO | WO 94/10658 | 5/1994 |
| WO | WO 94/16416 A1 | 7/1994 |
| WO | WO 99-19027 | 4/1999 |
| WO | WO 99-52077 | 10/1999 |
| WO | WO 01-54091 | 7/2001 |
| WO | WO 01/82176 A1 | 11/2001 |
| WO | WO 02-37246 | 5/2002 |
| WO | WO 02-47042 | 6/2002 |
| WO | WO 03-005743 | 1/2003 |
| WO | WO03/015299 A1 | 2/2003 |
| WO | WO 03-021543 | 3/2003 |
| WO | WO03/042830 A1 | 5/2003 |
| WO | WO 03-045518 | 6/2003 |
| WO | WO 2004/025397 A2 | 3/2004 |
| WO | WO 2004-056432 | 7/2004 |
| WO | WO 2004-095383 | 11/2004 |
| WO | WO 2004-095384 | 11/2004 |
| WO | WO 2005/083646 | 9/2005 |

OTHER PUBLICATIONS

PCT Written Opinion of the International Searching Authority, Jun. 6, 2005.
Examination Report from Corresponding Foreign Application No. 05 712 173.3, dated Feb. 1, 2007, 6 pages.
U.S. Appl. No. 09/491,899, filed on Jan. 27, 2000.
EPO Office Action mailed May 29, 2008 in European Application No. 05712173.3 (IGT1P105EP).
CIPO Office Action mailed Jun. 27, 2008 in Chinese Application No. 200580004417.4 (IGT1P105CN).
European Search Report dated Jul. 15, 2002 issued in EP 01 10 1836.
Supplementary European Search Report dated Dec. 27, 2006 issued in EP 03 77 0261.
PCT International Search Report dated Mar. 15, 2004 issued in PCT/US03/027136.
Australian Examiner's First Report dated Mar. 3, 2006 issued application No. 2003278735.
Russian Office Action dated Feb. 14, 2007 issued in 2006133042 (IGT1P105RU).
Russian Office Action dated Jul. 18, 2007 from corresponding RU Application No. 2005110677, 7 pgs. (IGTIP547RU).
Russian Office Action dated Mar. 17, 2008 from corresponding RU Application No. 2005110677, 16 pgs. (IGT1P547RU).
Russian Office Action dated Sep. 25, 2006 issued in application No. 2005110677 (IGT1P547RU).
US Office Action dated Jun. 1, 2004 issued in U.S. Appl. No. 10/244,156.
US Final Office Action dated Dec. 14, 2004 issued in U.S. Appl. No. 10/244,156.
US Office Action (Advisory Action) dated Mar. 7, 2005 issued in U.S. Appl. No. 10/244,156.
US Notice of Allowance dated Aug. 9, 2005 issued in U.S. Appl. No. 10/244,156.
US Office Action dated Dec. 17, 2008 issued in U.S. Appl. No. 11/320,188.
US Office Action dated Jan. 27, 2004 issued in U.S. Appl. No. 09/491,899.
US Office Action dated Jul. 12, 2004 issued in U.S. Appl. No. 09/491,899.
US Final Office Action dated Mar. 4, 2005 issued in U.S. Appl. No. 09/491,899.
US Office Action dated Sep. 7, 2005 issued in U.S. Appl. No. 09/491,899.
US Final Office Action dated Mar. 1, 2006 issued in U.S. Appl. No. 09/491,899.
US Office Action (Examiner Interview Summary) dated Mar. 20, 2006 issued in U.S. Appl. No. 09/491,899.
US Office Action dated Aug. 7, 2006 issued in U.S. Appl. No. 09/491,899.
US Final Office Action dated Jan. 11, 2007 issued in U.S. Appl. No. 09/491,899.
US Office Action (Advisory Action) dated Jun. 26, 2007 issued in U.S. Appl. No. 09/491,899.
US Office Action (Examiner's Answer) dated Feb. 6, 2008 issued in U.S. Appl. No. 09/491,899.
US Office Action dated Apr. 24, 2008 issued in U.S. Appl. No. 09/491,899.
US Office Action (Reply Brief) dated Jul. 28, 2008 issued in U.S. Appl. No. 09/491,899.
US Office Action dated Feb. 6, 2009 issued in U.S. Appl. No. 09/491,899.
US Office Action dated May 8, 2006 issued in U.S. Appl. No. 10/395,963 [P490A].
US Office Action Final dated Mar. 29, 2007 issued in U.S. Appl. No. 10/395,963 [P490A].
US Office Action Final dated Sep. 19, 2007 issued in U.S. Appl. No. 10/395,963 [P490A].
US Office Action Final dated Jan. 8, 2008 issued in U.S. Appl. No. 10/395,963 [P490A].
US Examiner Interview Summary dated Apr. 7, 2008 issued in U.S. Appl. No. 10/395,963 [P490A].
US Advisory Action dated Apr. 8, 2008 issued in U.S. Appl. No. 10/395,963 [P490A].
US Office Action dated Jul. 21, 2008 issued in U.S. Appl. No. 10/395,963 [P490A].
US Office Action Final dated Jan. 21, 2009 issued in U.S. Appl. No. 10/395,963 [P490A].
US Advisory Action dated May 4, 2009 issued in U.S. Appl. No. 10/395,963 [P490A].
US Office Action Final dated Jun. 9, 2009 issued in U.S. Appl. No. 10/395,963 [P490A].
US Advisory Action dated Sep. 17, 2009 issued in U.S. Appl. No. 10/395,963 [P490A].
US Office Action dated Dec. 18, 2009 issued in U.S. Appl. No. 10/395,963 [P490A].
US Office Action Final dated Jul. 2, 2010 issued in U.S. Appl. No. 10/395,963 [P490A].
US Office Action dated Jan. 9, 2007 issued in U.S. Appl. No. 10/395,988 [P490B].
US Office Action dated Aug. 15, 2007 issued in U.S. Appl. No. 10/395,988 [P490B].
US Office Action dated Mar. 26, 2008 issued in U.S. Appl. No. 10/395,988 [P490B].

US Office Action dated Oct. 15, 2008 issued in U.S. Appl. No. 10/395,988 [P490B].
US Office Action Final dated Mar. 9, 2009 issued in U.S. Appl. No. 10/395,988 [P490B].
US Advisory Action dated Jul. 2, 2009 issued in U.S. Appl. No. 10/395,988 [P490B].
US Office Action dated Aug. 13, 2009 issued in U.S. Appl. No. 10/395,988 [P490B].
US Notice of Allowance dated Jan. 29, 2010 issued in U.S. Appl. No. 10/395,988 [P490B].
US Office Action (Miscellaneous Communication) dated Mar. 29, 2010 issued in U.S. Appl. No. 10/395,988 [P490B].
US Office Action dated Apr. 28, 2010 issued in U.S. Appl. No. 10/395,988 [P490B].
Chinese Office Action (Notification of the Office Rejection) dated Oct. 16, 2009 issued in CN200580004417.4 [P105CN].
Mexican Office Action (description) dated May 8, 2009 issued in MX 06/09088 [P105MX].
PCT International Search Report dated Aug. 20, 2004 issued in WO2004-095383 (PCT/US2004/007423).
PCT Written Opinion dated Aug. 20, 2004 issued in WO2004-095383 (PCT/US2004/007423).
PCT International Preliminary Examination Report dated Oct. 1, 2005 issued in WO2004-095383 (PCT/US2004/007423).
Australian Examiner's First Report dated May 4, 2007 issued in 2004232143 [P490A-AU].
Australian Examiner's Report No. 2 dated Oct. 16, 2007 issued in 2004232143 [P490A-AU].
Australian Examiner's Report No. 3 dated May 12, 2008 issued in 2004232143 [P490A-AU].
AU Notice of Opposition dated Oct. 31, 2008 issued in 2004232143 [P490A-AU].
AU Opposition Statement of Grounds and Particulars in Support of Notice of Opposition (Aristocrat Technologies Australia Pty Limited) dated Jan. 23, 2009 issued in AU2004232143 [P490A-AU].
AU Acknowledgement re Notice of Opposition Withdrawn dated Aug. 18, 2009 issued in AU2004232143 [P490A-AU].
European Examination Report dated Apr. 10, 2006 in EP 04 719 756.1 [P490A-EP].
European Examination Report dated Nov. 9, 2006 issued in EP 04 719 756.1 [P490A-EP].
European Examination Report dated Jul. 9, 2007 issued in EP 04 719 756.1 [P490A-EP].
European Result of Consultation dated May 16, 2008 issued in EP 04 719 756.1 [P490A-EP].
Russian Office Action (translation) dated Mar. 12, 2008 issued in RU 2005132833 [P490A-RU].
Russian Decision to Grant a Patent for Invention dated Jul. 28, 2008 issued in RU 2005132833 [P490A-RU].
PCT International Search Report dated Aug. 30, 2004 issued in WO2004-095384 (PCT/US2004/007844).
PCT Written Opinion dated Aug. 30, 2004 issued in WO2004-095384 (PCT/US2004/007844).
PCT Preliminary Examination Report dated Oct. 1, 2005 issued in WO2004-095384 (PCT/US2004/007844).
Australian Examiner's First Report dated May 7, 2007 issued in AU20044232158 [P490B-AU].
Australian Examination Report No. 2 dated Aug. 20, 2007 issued in AU2004232158 [P490B-AU].
European Examination Report dated Jul. 12, 2006 issued in EPO 04 720 816.0 [P490B-EP].
Russian Office Action (translation) dated Oct. 18, 2007 issued in RU 2005132832 [P490B-RU].
Russian Decision to Grant a Patent dated Apr. 22, 2008 issued in RU 2005132832 [P490B-RU].
21 Casino as accessed from Online Gambling Guide link, found at 2lcasino.com, 6 pages, downloaded Mar. 10, 2007, but listed as link on/within Online Gambling Guide directory of 2001.
BoDog Sportsbook as accessed from Online Gambling Guide link, found at bodog.com, 1 page, downloaded Mar. 10, 2007, but listed as link on/within Online Gambling Guide directory 2001.
Golden Palace Online Casino at goldenpalace.com, 15 pages, downloaded Dec. 2, 1999.
Lasseters Online Casino as accessed from Online Gambling Guide link, found at lasseters.com, 26 pages, downloaded Mar. 12, 2007, but listed as link on/within Online Gambling Guide directory.
PlanetLuck Casino as accessed from Online Gambling Guide link, found at planetluck.com, 6 pages, downloaded Mar. 10, 2007, but listed as link on/within Online Gambling Guide directory of 2001.
StarLuck Casino as accessed from Online Gambling Guide link, found at StarLuckCasino.com, 8 pages, downloaded Mar. 10, 2007, but listed as link on/within online Gambling Guide directory of 2001.
The Gaming Table by Fast Company.com, Issue 18, 2 pages, dated Sep. 1998.
The Online Gambling Guide to Gaming Sites by Gamingsites.com with links to StarLuck Casino, PlanetLuck Casino, 21 Casino, BoDog Sportsbook and Lasseters Casino, 7 pages, dated 2001 (states Guide is 2001 directory).

* cited by examiner

PLAYER VERIFICATION METHOD AND SYSTEM FOR REMOTE GAMING TERMINALS

TECHNICAL FIELD

The present invention relates generally to methods and systems for providing authentication in a gaming environment, and more specifically to methods and systems for authenticating a player at a remote gaming location.

BACKGROUND

It has become popular in recent years for many gaming (i.e., gambling) operators, such as casinos, Internet-based groups and other gaming establishments, to provide various ways of allowing players to engage in betting and wager type games from remote locations. In such instances, a player can generally participate in gaming activities from a remote gaming terminal that is at some location other than an established casino floor or other authorized and regulated gaming location. Various mediums that can be used for providing a remote gaming terminal include, for example, interactive television (iTV), personal computers, and established kiosks with customized controls and displays, among others. In addition, remote gaming can take place, for example, over a closed network, whereby patrons can engage in gaming activities from established kiosks or their private hotel rooms, as well as online, whereby players can participate in gaming activities on various Internet websites at virtually any location.

A number of problems have emerged, however, with respect to the advent of remote gaming. Many forms of gaming are highly regulated, albeit with wide variations in the rules and regulations existing from jurisdiction to jurisdiction, and it is particularly significant that the location of the player typically governs which set of laws apply. While many gaming operators are generally responsible in providing and running their closed gaming networks and/or Internet gaming websites from locations where gaming is legal, remote access to the gaming activities provided therein can sometimes problematically be had from locations where gaming is illegal, particularly in the case of Internet websites. Furthermore, virtually all jurisdictions that allow some form of gaming have strict laws and regulations with respect to the minimum age of any player that can participate in such games. While age verification and player restrictions can be easily and reliably made on a casino floor or at any other authorized and regulated gaming location, such measures tend to be more difficult and less reliable at remote gaming terminals. In fact, the control of underage gaming at environments such as hotel rooms, personal computers and other remote locations is a continuing problem that limits the growth of legitimate mobile or Internet-based gaming worldwide. The verification of who is trying to place bets from a remote gaming terminal and if such a person is underage is a well-known problem.

As a result of these and other related problems, many gaming operators and regulators have considered the impact of remote gaming and have started to implement various rules and procedures specific to remote gaming activities. In general, these added rules and procedures address some of the problems associated with the enforcement of existing laws and regulations, such as age limits, as well as issues related to the new potential availability of gaming activities to players located in jurisdictions where gaming is illegal. One example of such an added procedure is for the gaming system to require the verification of legitimate players whose identities have been previously confirmed before any remote gaming activities can commence. In some instances, players must enter individualized identification codes, such as PIN numbers, into the remote gaming terminal to identify themselves before gaming may begin. Other possible procedures involve the reading of a fingerprint or some other biometric indicator by a connected device at the remote gaming terminal to verify the identity of a player before gaming can begin.

Such verification procedures and systems can be readily defrauded or circumvented in many cases, however, as an underage child could learn the access code of a parent or other adult and then engage in gaming activities illegally. In addition, a legitimate player might properly log in to such a gaming system at a remote gaming terminal and then completely hand off control to another user or otherwise permit another player to play. Another disadvantage of such verification procedures and systems is that they are all a "one-time" process, such that gaming activities at the remote gaming terminal are allowed to continue on indefinitely after an initial verification procedure, despite the potential for changes that would result in the termination of gaming activities in a more closely monitored environment. Such changes could involve a significant reduction in the capacity in the legitimate player, a criminal interception or interference of a gaming session by unscrupulous third parties, or simply a handing off of the remote gaming terminal from the legitimate player to an underage or otherwise unauthorized user.

Accordingly, there exists a need for improved methods and systems for providing player verification in remote gaming terminals, and in particular for such methods and systems to verify the actual player or players that are participating in gaming activities at the remote gaming terminal in an ongoing or repeated basis.

SUMMARY

It is an advantage of the present invention to provide improved and more reliable methods and systems for verifying actual players at remote gaming terminals. This is accomplished by providing one or more gaming events at a remote gaming terminal via a first mode of communication, establishing one or more acceptable criteria for verifying the identity or eligibility of a player, receiving a request by a specific player at the remote gaming terminal to participate in a particular gaming event, obtaining personal information for that specific player, verifying that the obtained personal information regarding the specific player is adequate, and permitting the requested gaming event to commence or continue.

According to one embodiment of the present invention, the provided method and system involve obtaining personal information for a player via a second mode of communication that is separate from the first mode of communication. This separate mode of communication can occur via an entirely separate communication means, or can occur along a separate channel of the same communication means used to provide the gaming event or events. The personal information for a player can be obtained either after or during the process of receiving a request from that player to participate in a specific game. This request can be associated with a particular player account, and a determination can also be made as to whether that player is authorized to participate in the requested gaming event.

In a particular embodiment, the obtained personal information can be one or more live or recorded visual images of the specific player. Such visual images can be photographic, with digitized pictures being preferred. In such an embodiment, the mode of communication for transmitting these pictures can be a cellular telephone call, with the pictures being taken by a camera within the cellular phone itself.

In another particular embodiment, the obtained personal information can be the geographic location of the player. This geographic location can be determined by a global positioning system that is in proximity to and in communication with the remote gaming location, and that transmits the current geographic location of the player to the gaming operator. Such a global positioning system can be within a cellular phone used by the player, with the geographic location of the player being communicated by a call from the cellular phone. Such a cellular phone may also have a camera, such that the geographic location and pictures of a specific player can both be transmitted via a cellular telephone call.

In yet another particular embodiment, the obtained personal information can be the voice of the player, for which voice recognition software can be used to authenticate the player. Again, the mode of communication for transmitting the voice of the player can be a telephone call, and in particular a cellular telephone call.

According to another embodiment of the present invention, which can include some or all of the features of one or more of the foregoing embodiments, the disclosed method and system includes a subsequent repetition during the gaming event or session of the steps of obtaining personal information, verifying that the obtained personal information is adequate, and permitting the requested gaming event to commence or continue. Such subsequently repeated steps can be performed continuously, at regular periodic intervals, or at random intervals, as desired.

According to still another embodiment of the present invention, which again can include some or all of the features of one or more of the foregoing embodiments, the disclosed method and system includes a third party authorizer that is separate from the remote gaming operator or host. The personal information for the specific player is communicated to this third party authorizer, which analyzes the personal information, determines whether it such information is adequate, and then forwards a signal to the remote gaming operator or host. This forwarded signal can contain a "player approved" indication, a "player denied" indication, and/or other indications or information regarding the specific player, as desired.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive methods and systems for providing player verification in remote gaming terminals. These drawings in no way limit any changes in form and detail that may be made to the invention by one skilled in the art without departing from the spirit and scope of the invention.

DETAILED DESCRIPTION

Figure 1:
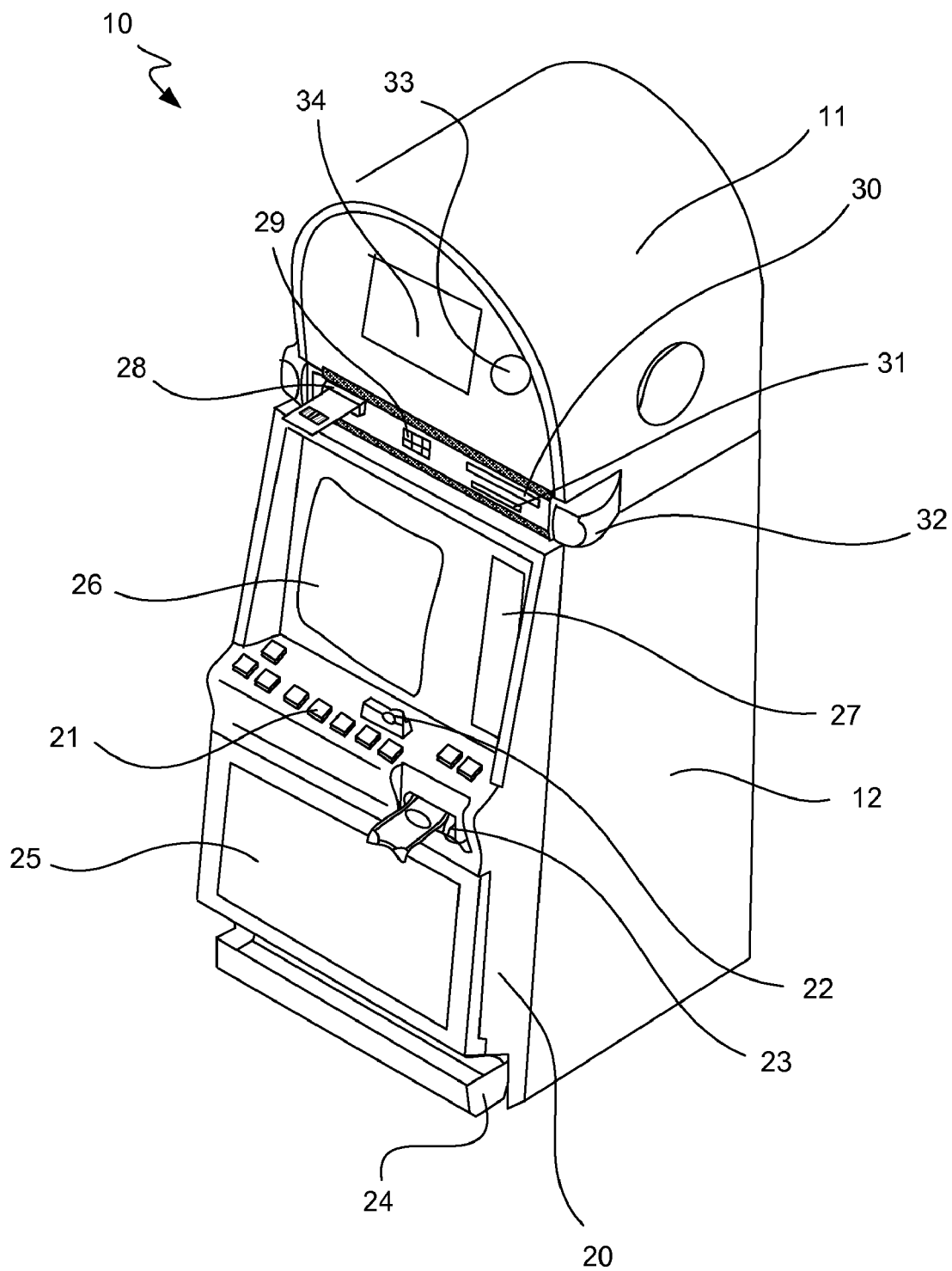
FIG. 1 illustrates in perspective view an exemplary gaming machine according to one embodiment of the present invention.

An example application of a method and system according to the present invention is described in this section. This example is being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

One advantage of the present invention is the provision of a more reliable method and system for initially verifying players in remote gaming terminals, such that a higher level of confidence can be had that any person engaging in a gaming event at a remote gaming terminal is an appropriate person for that gaming event. In one embodiment, personal information for a player is obtained after or during the process of receiving a request from that player to participate in a specific gaming event, such that unauthorized access to that gaming event can be prevented despite the presence of a correct input or command. This is preferably accomplished by transmitting the personal information via a mode of communication that is separate from the mode of communication that provides the gaming event at the remote gaming terminal, verifying that the obtained personal information is adequate, and then permitting the gaming event to commence.

Another advantage of the disclosed method and system is that the separate mode of communication for transmitting personal information permits the verification or authorization of players to be performed by a third party authorization center or other verifier, whereupon a simplified signal regarding the results of the verification process can then be forwarded separately to the gaming operator or host. This allows the gaming operator or host to provide gaming events at remote terminals and to provide for the verification of prospective players in a responsible manner while not being troubled with many of the problems inherent to managing an extensive remote player verification system or service.

Yet another advantage of the disclosed method and system is the ability to verify a player repeatedly during the progress of the gaming event or session at the remote gaming terminal.

This advantageously hinders the ability of players to log in to the system properly and then hand off control of the remote gaming terminal to an underage or otherwise unauthorized player. This is accomplished through the subsequent repetition during the gaming event or session of the steps of obtaining personal information, verifying that the obtained personal information is adequate, and permitting the requested gaming event to commence or continue.

As an initial matter, it should be noted that while the inventive player verification method and system disclosed herein is being described primarily with references to and illustrations of remote gaming terminals, gaming establishments, gaming machines and games of chance in general, this verification system is readily adaptable for use in other types of businesses and environments, such that its use is not restricted exclusively to remote gaming terminals, gaming establishments, gaming machines or games of chance. Continuing now with the illustrative example of a remote player verification method and system used in conjunction with a casino, Internet-based gaming group, or other remote gaming provider or administrator, various examples of gaming machines, devices and systems that can provide gaming events to remote gaming terminals are provided in greater detail.

Referring first to FIG. 1, an exemplary gaming machine according to one embodiment of the present invention is illustrated in perspective view. Gaming machine 10 includes a top box 11 and a main cabinet 12, which generally surrounds the machine interior (not shown) and is viewable by users. Main cabinet 12 includes a main door 20 on the front of the machine, which opens to provide access to the interior of the machine. Attached to the main door are typically one or more player-input switches or buttons 21, one or more money or credit acceptors, such as a coin acceptor 22, and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional electronically controlled video monitor. Top box 11, which typically rests atop of the main cabinet 12, may also contain a bill or ticket validator 28, a key pad 29, one or more additional displays 30, a card reader 31, one or more speakers 32, one or more cameras 33, and a secondary video display monitor 34, which may also be a cathode ray tube, high resolution flat-panel LCD, plasma/LED display or other conventional electronically controlled video monitor.

It will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Such an adaptation preferably involves the implementation of one or more types or modes of communication from the gaming machine to at least one outside location, such as a remote gaming terminal itself, as well as the incorporation of a gaming network that is capable of supporting a system of remote gaming with multiple gaming machines and/or multiple remote gaming terminals. Additional components and devices that can be used to permit gaming machine 10 to be used in a remote gaming environment will now be presented in greater detail.

Figure 2:
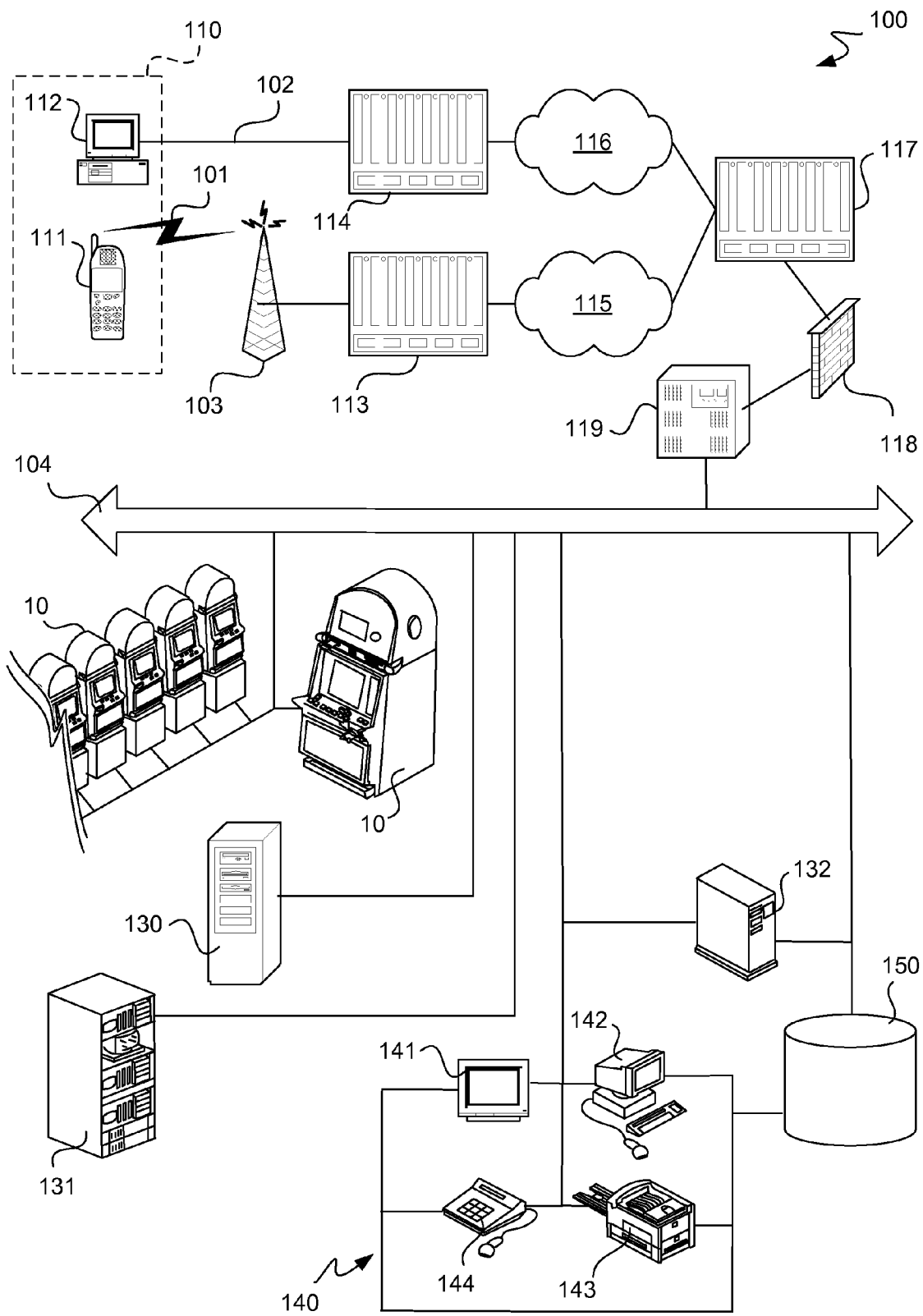
FIG. 2 illustrates a block diagram of an exemplary network infrastructure for providing a remote gaming system according to one embodiment of the present invention.

Turning now to FIG. 2, a block diagram of an exemplary network infrastructure for providing a remote gaming system according to one embodiment of the present invention is illustrated. Remote gaming system 100 comprises one or more remote gaming terminals 110, a variety of communication items, and a number of host-side components and devices adapted for use with a remote gaming environment and the inventive remote player verification methods and systems disclosed herein. One or more gaming machines 10 adapted for use in conjunction with remote gaming system 100 and at least one remote gaming terminal 110 can be in a plurality of locations, such as in banks on a casino floor, standing alone at a smaller non-gaming establishment, or in isolation and not generally exposed to live in-person play. In addition, one or more game servers or other game play devices available for play from remote gaming terminal 110 may reside within remote gaming system 100, as described in greater detail below.

Remote gaming terminal 110 is located remotely from a primary casino floor or other monitored gaming environment, and preferably contains at least one independent player verifier 111 in addition to at least one game-providing device 112. Player verifier 111 can be any of a number of different devices, such as, for example, a fingerprint sensor, a retinal scanner, a voice recognition hardware device, or a cellular telephone, among others. This player verifier 111 is preferably separate from the game-providing device 112, and at any rate is at least configured to communicate within the remote gaming system 100 along a mode of communication 101 that is separate from the mode of communication 102 that is used for the game-providing device. Game-providing device 112 can be any of a number of different devices, such as, for example, another separate gaming machine, a proprietary kiosk, an iTV system, a home or personal computer, or a personal desk assistant (PDA), among others. Such a device can include any number of components, such as, for example, a display unit, one or more speakers or other output unit, a keyboard or other input unit or units, one or more communication units, one or more processors, and/or other electronics and circuitry, as desired.

Modes of communication 102 between a game-providing device 112 and gaming machine 10 can involve, for example, a hard-wired connection directly to the gaming machine or network, direct dial-up connections that can involve CDMA, GSM or other similar connections, wireless systems such as a BLUETOOTH®, Wi-Fi or other type of wireless network, or any form of Internet connection, although other types of communication are also contemplated. As illustrated here, communication 102 is a telephone call, which is typically handled on the client-side by a common client local exchange carrier (LEC) 114, which passes the communication through a general network switching fabric 116. It will be readily appreciated that this switching fabric can be asynchronous transfer mode (ATM) based, Internet protocol (IP) based, or based in any other functional communication mode as required by the particular communication means used. Communication 102 is typically handled on the host side by a host LEC 117, which typically connects to the host (i.e., gaming operator) through a firewall 118 and private branch exchange (PBX) 119 or other similar communication or routing device. As shown, PBX 119 connects directly to common bus 104, from which communications to any number of machines in the remote gaming network may be had.

According to one embodiment of the present invention, player verifier 111 can include at least one biometric device, such as a fingerprint sensor. Such a fingerprint sensor can be an MBF300 Fingerprint Sweepsensor™ manufactured by Fujitsu, Ltd. of Tokyo, Japan, or either of the EntrePad AES3400 or AES2500 Fingerprint Sensors manufactured by AuthenTec, Inc. of Melbourne, Fla., for example, although other brands and types of fingerprint sensors can be effectively utilized as well. Various examples of player verification using a biometric identifier are disclosed in commonly assigned U.S. Pat. No. 6,979,264, by Rowe, et al., filed Sep. 12, 2002, and entitled "Method and System for Verifying Entitlement to Play a Game Using a Biometric Identifier," which application is incorporated herein in its entirety and for all purposes. Another example of biometric information being used in conjunction with gaming machines and systems is described in commonly assigned and co-pending U.S. patent application Ser. No. 09/491,899, by Wells, et al. filed on Jan. 27, 2000, and entitled "Gaming Terminal and System with Biometric Identification," which application is also incorporated herein in its entirety and for all purposes.

Although the foregoing illustrative example has been made with respect to the biometric example of a fingerprint, it will be readily understood that other forms of biometric information can be used in place of or in conjunction with a fingerprint. Examples of such additional biometric features include facial features, for which facial recognition programs and hardware units are available, vocal tones and features, for which voice recognition programs and hardware units are available, and retinal features, for which retinal scan programs and hardware units are available. Any one of these or a variety of other biometric indicators can be used in conjunction with the provided remote player verification method and system to result in an application whereby some particular biometric feature of an established player is stored and utilized to compare to a subsequently read biometric feature of a current player to verify whether the current player is legitimate. In this manner, a much higher level of control over play at remote gaming terminals may be had by an operating or managing entity, such as a casino or Internet-based gaming entity. In a particularly preferred embodiment, player identifier 111 is a cellular telephone having picture-taking capabilities, and mode of communication 101 is a telephone call between this cellular phone and host-side PBX 119.

As discussed above, it is preferable that data from whatever device is used as a player identifier 111 is transmitted between the client-side and host-side of the remote gaming system 100 along a mode of communication 101 that is separate from the mode of communication 102 between the host-side gaming machine or servers and the client-side game-providing device 112. While one way of accomplishing this would be to provide separate network addresses and channels for each player verification hardware item, it is thought that the implementation of a separate player verification network would result in a system that is even more foolproof. It is also specifically contemplated that mode of communication 101 could also be a cellular telephone call placed from the remote gaming terminal 110 along a standard communication network and received at a host-side PBX or similar communication device 119. This PBX 119 could be incorporated within a gaming machine 10 if desired, but is preferably outside the gaming machine and in communication with either one or more gaming machines, a host-side player verification system, and/or common host network bus 104.

Alternatively, the system can be configured such that this host-side PBX or similar communication device is at a third party verifier or authorization center (not shown), whereby information for player verification or authorization is first sent to this third party verifier. After appropriate review or analysis of such information, the third party verifier or authorization center then forwards a signal, such as an authorization signal, a denial signal and/or other information to the remote gaming operator or host, which is accomplished on a separate line of communication (not shown), as described in greater detail below. This separate line of communication connecting the third party verifier to the remote gaming operator or host can be of any suitable communication means, such as, for example, a hard-wired connection directly to the relevant gaming machine or network, a direct dial-up connection that can involve CDMA, GSM or other similar connections, a wireless system such as a BLUETOOTH®, Wi-Fi or other type of wireless network, or any form of Internet connection, although other types of communication are also contemplated, as will be readily appreciated by those skilled in the art.

Because it is a cellular call, communication 102 is likely handled by one or more cellular reception units 103, and like communication 101, communication 102 is also typically handled on the client-side by a client LEC 113, which may or may not be the same LEC used for communication 102. LEC 113 passes communication 101 through a general network switching fabric 115, which may or may not be the same general network switching fabric 116 used for communication 102. As will be readily appreciated, communication 101 will also be handled on the host side much like communication 101, that is by host LEC 117, firewall 118, and PBX 119 or other similar communication or routing device.

Gaming machines 10 and other game play servers or devices adapted for use in remote gaming system 100 are preferably connected to a host-side network via any desired operable connection means, such as by direct wiring, dial-up, BLUETOOTH® or other wireless, or a connection to an Internet server or Internet service provider, for example. These gaming machines and other game play servers or devices adapted for remote play are also preferably connected to a host-side remote gaming network via connection to common bus 104.

In addition to one or more gaming machines 10 and one or more PBXs or other communication devices 119, host-side common bus 104 can also connect a number of other networked devices, such as, for example, a general-purpose server 130, one or more special-purpose servers 131, 132, a sub-network of peripheral devices 140, and/or a database 150. Such a general-purpose server 130 may be already present within an establishment for one or more other purposes in lieu of or in addition to remote game playing and remote player verification. Functions for such a general-purpose server can include, for example, both general and game specific accounting functions, payroll functions, general Internet and e-mail capabilities, switchboard communications, and reservations and other hotel and restaurant operations, as well as other assorted general establishment record keeping and operations. In some instances, remote game play and remote player verification functions may also be associated with or performed by such a general-purpose server. For example, such a server may contain various programs related to general game play operations, remote game play administration and remote game player verification, and may also be linked to one or more gaming machines adapted for remote game play within an establishment, in some cases forming a network that includes all or substantially all of the remote game play capable machines within that establishment. Communications can then be exchanged from each adapted gaming machine to one or more player verification related programs or modules on the general-purpose server.

In a particularly preferred embodiment, however, remote gaming system 100 comprises one or more special-purpose servers that can be used for various functions relating to the provision of remotely played games and remote player verification. Such special-purpose servers can include, for example, a GPS server 131, a player verification server 132, a general game server (not shown), and/or a specialized accounting server (not shown), among others. Such additional special-purpose servers are desirable for a variety of reasons, such as, for example, to lessen the burden on an existing general-purpose server or to isolate or wall off some or all remote player verification information from the general-purpose server and thereby limit the possible modes of access to such remote player verification information. Alternatively, remote gaming system 100 can be isolated from any other network within the establishment, such that a general-purpose server 130 is essentially impractical and unnecessary. Under either embodiment of an isolated or shared network, one or more of the special-purpose servers are preferably connected to sub-network 140. Peripheral devices in this sub-network may include, for example, one or more video displays 141, one or more user terminals 142, one or more printers 143, and one or more other digital input devices 144, such as a card reader or other security identifier, among others. Similarly, under either embodiment of an isolated or shared network, at least the player verification server 132 or another similar component within a general-purpose server 130 also preferably includes a connection to a remote player database or other suitable storage medium 150.

Database 150 is preferably adapted to store many or all files containing pertinent data or information for players registered with the remote gaming system, with this data or information being particularly relevant to player verification at a remote gaming terminal. Player files and other information on database 150 can be stored for backup purposes, and are preferably accessible to one or more system components, such as a specially adapted gaming machine 10, a general-purpose server 130, a GPS server 131, and/or a player verification server 132, as desired. Database 150 is also preferably accessible by one or more of the peripheral devices on sub-network 140 connected to remote player verification server 132, such that information or data specific to given players or transactions that are recorded on the database may be readily retrieved and reviewed at one or more of the peripheral devices, as desired. Although shown as directly connected to common bus 104, it is also contemplated that such a direct connection can be omitted and that only a direct connection to a player verification server or other similar analyzing device be present in the event that heightened security with respect to player files is desired. Additional features and characteristics specific to database 150 and the player files therein are provided in greater detail below.

It will be readily appreciated that the foregoing system as illustrated pertains to a gaming operator or host that conducts its own remote player verification or authorization. As noted previously and discussed in greater detail below, however, it may be preferable to include or retain a third party verifier or authorization center (not shown) that is separate from the gaming operator or host. This third party verifier or authorization center could be adapted to receive personal information for a specific player, perform the actual verification or authorization for that player (i.e., analyze the information to determine whether it is adequate), and then forward one or more signals or other informational items to the gaming operator or host accordingly. This could include a confirmation or "player approved" signal, a cease play or "player denied" signal, and/or other indicators or player information, as desired. Of course, under such a third party arrangement, one or more host side items may be removed from a location along common bus 104 to a separate third party location (not shown). Such items can include, for example, GPS server 131, player verification server 132, and database 150, among others. This separate third party location could then have a separate line of communication to the host, such as, for example, to common bus 104, which separate line could include any appropriate communication means.

With a preferred remote gaming system, such as the remote gaming system 100 illustrated in FIG. 2 and discussed herein, it is thus possible to provide one or more gaming events at a remote gaming terminal via a first mode of communication, establish one or more acceptable criteria for verifying the identity or eligibility of a player, receive a request by a specific player at the remote gaming terminal to participate in a particular gaming event, obtain personal information regarding that specific player from said specific player via a separate second mode of communication, verify that the obtained personal information is adequate according to at least one of the acceptable criteria, and permit the requested gaming event to commence or continue. In such instances, the remote gaming terminal can be a secondary gaming machine that provides downloadable games or communicates with a primary gaming machine that actually runs gaming events from a central location for various remote gaming terminals. It is also worth noting that while the game being presented at the remote gaming terminal may originate from a single gaming machine, as shown in FIG. 2, it is actually preferable that such games be run from a game server, such that a wider variety and number of games and options be available at a plurality of remote gaming terminals simultaneously.

In a preferred embodiment, it is specifically contemplated that the obtaining of personal information from a prospective player occurs either after that player makes a request to participate in a particular gaming event or during the process of making the specific request. This presumably results in personal information that is either live or at least very current, such that the use of less reliable or potentially fraudulent older personal information is reduced. In addition, it is preferable that an authentication or other preliminary identifying step first occur, such that the system is alerted as to which presumably registered player is attempting to access the remote gaming system. In this regard, a player can first enter a player name or handle and an associated password, after which the player verification can be made according to the personal information obtained. Hence, the request to play a specific gaming event is preferably first associated with a particular registered player account before a player verification is made.

It is also preferable that other factors beyond a personal identification also be available for determining whether a given player is authorized to participate in the requested gaming event. For example, it may be desirable to allow some players to play a general slate of slots and table games, but to forbid them from playing high stakes games, such as baccarat. It may also be desirable to set limits on some or all players. For example, a given player may have a loss limit of $500 per day on the remote gaming system, with an ultimate account balance of $5000, whereupon the realization of either limit results in further play for that player being terminated until an appropriate resolution is made. Other issues may involve security problems or a recorded history of a given individual engaging in problematic activity, such as attempting to defraud the system or hand off control to an underage or otherwise unauthorized player. Such acts may result in the desire to further limit or ban an otherwise positively identified registered player.

While some of these factors may be related to safeguards for the remote gaming provider and its own business losses and objectives, others may be due to the implementation of harm minimization features and other civic-minded safeguards. Harm minimization principles, factors and features are generally well known in the gaming industry, with some examples being presented in an August 2002 white paper by the Australian Gaming Council entitled "Current Issues Related to Identifying the Problem Gambler in the Gaming Venue," which paper is incorporated herein in its entirety and for all purposes. In general, harm minimization involves the restriction or termination of play for a given player based on concerns for the well being of that given player. Although acting to restrict or deny play for some individuals can likely result in some immediate loss of revenue for a gaming operator, many gaming operators understand that the long term effects of permitting problem gamblers to play unchecked can be severely detrimental to those gamblers, their friends and families, and society in general, in addition to creating a bad reputation for the gaming industry. Accordingly, many gaming operators prefer to implement some forms of harm minimization where possible.

The application of harm minimization procedures is preferably case specific, and undertaken for each person based on the problems and circumstances present for that person. Although opinions on the subject vary significantly, some identified factors that indicate that a person might have a gambling problem can include different behaviors when an individual plays alone as opposed to with others, increased stress and noticeably erratic behavior or outbursts, unusual betting patterns, variations in amounts bet, length of gaming sessions, frequency of gaming sessions, amount of money lost, use of credit, number of trips to a cash machine or number of buy-ins, and level of alcohol consumption while gaming, among others. Although it may not be possible or practical to monitor and intervene with respect to all of these and other such factors, the implementation of various features to help minimize the problems in a problem gambler or at least raise awareness as to the possibility of a problem may be particularly desirable.

In addition to acting to restrict or prevent play as an extreme measure in some cases where justified, other harm minimization measures or notices of varying levels of severity can include, for example, displaying cash amounts rather than credits, displaying the length of time played at a particular machine or remote gaming terminal, displaying reminders to take a break or slow down, reducing the level of enticing graphics or other sensory elements in game play, forcibly slowing the pace of the game, sending a message to the player or host of the remote gaming terminal to limit alcohol consumption, displaying phone numbers for help services, sending mailers to potentially problematic players, forcing a cash out at a given time, and/or forcing a break in play for a set period of time, among others. Some or all of these measures may be implemented by a remote gaming system operator at one or more of its remote gaming terminals, as desired. In one embodiment, it is specifically contemplated that such harm minimization measures can be implemented based not only on each player, but also based upon each location, as some jurisdictions may have differing laws, requirements, and/or recommended procedures with respect to the implementation of such measures. The location of a particular player or remote gaming terminal can be included as part of the personal information for that player, as described in greater detail below.

In one preferred embodiment of the present invention, the personal information obtained from the prospective or current player being verified can be one or more visual images of that specific player. Such visual images can include photographs or other analog images, but preferably include one or more digitized pictures of the player. Such pictures are preferably current or contemporaneous pictures, and as such can be created after the player places a request to play a specific game. In some instances, it may be desirable for the pictures to be created and transmitted while the player is placing a request to participate in a specific gaming event, and in such cases the picture or visual image may even be a live visual image.

Although it will be readily appreciated that several mediums are suitable for providing pictures or other visual images of a player, it is specifically contemplated that a cellular telephone with picture taking capabilities be used both to take the pictures of the player (i.e., obtain personal information), but also to transmit this personal information along a mode of communication (i.e., a cell phone call) that is separate from the mode of communication upon which the gaming event is provided. A variety of off-the-shelf cellular telephones and subscriber plans having such picture taking capabilities and transmissions over cellular telephone calls are available, with examples including T-Mobile, Sprint, Verizon and AT&T, among others. It is specifically contemplated that these and any other devices and plans with similar capabilities are suitable for use with the present invention.

In another preferred embodiment of the present invention, the personal information obtained from the prospective or current player being verified can also be information regarding the actual current geographic location of that specific player. This can be determined by, for example, a global positioning system that is adapted to determine player position and communicate that information independently on a separate mode of communication. Inclusion of this type of personal information can assist greatly in the prevention or reduction of remote gaming sessions from jurisdictions where gaming is illegal or restricted. In such an instance, a GPS server or other similar hardware item can be specifically adapted to note the geographic location of a purported player, and then either permit that player to play all games, restrict that player from all games, or permit certain games and/or betting limits or actions, as allowed by the jurisdiction where that player is currently located.

Although many types of GPS units are possible for use with the present system, it is specifically contemplated that the GPS units and capabilities of a cellular telephone be adapted for use with the inventive methods and systems provided herein. As will be readily known to those skilled in the art, many types of cellular telephones now come equipped with basic GPS capabilities, such that the current geographic location of a transmitting cellular telephone can be verified to a reasonable degree of certainty. By utilizing the GPS features present in a picture-capable cellular telephone, it is possible to provide not only contemporaneous visual images of a prospective or current player, but also a current geographic location for that player over the same cellular telephone call.

Alternatively, the cellular telephone may be used with reference to a plurality of stations or other transceivers within its cellular network, such that its position can be triangulated accordingly, as will be readily understood by those skilled in the art. Such an alternative method for determining the location of the cellular phone (and presumably the remote player)

can be particularly useful indoors or in other locations where GPS signals might be weak or otherwise impractical. By way of such a triangulation or a GPS determination for location, both this and the previous preferred embodiment can be practiced at the same time, with the advantages inherent to each embodiment being simultaneously realized.

In yet another preferred embodiment of the present invention, it is specifically contemplated that the steps of obtaining and verifying personal information, and permitting a given remote gaming event or session to continue are repeated even after the gaming event has already been allowed to commence. Of course, such a preferred embodiment may be used in combination with one or more of the previously discussed preferred embodiments, resulting in an even better method or system. The repetition of these steps is particularly useful in preventing or at least limiting the ability of a legitimate player to hand off control of the remote gaming terminal to an underage or otherwise unauthorized player. The repetition of these steps can result in a particular gaming event or session being terminated if it is determined that an inappropriate use or activity has occurred or is in the process of taking place. In this manner, it can be said that ongoing monitoring of the remote gaming terminal is essentially taking place.

While the repeated verification of a player can take place at regularly timed intervals, such as every 5 to 10 minutes, for example, it is thought that re-verification at random intervals can result in stricter adherence to proper play by the registered player, as it would then be unknown as to when a re-verification might occur next or is presently occurring. Alternatively, it is possible that the repetition of obtaining personal information and verifying the player can be continuous. For example, it can be required that a player make a cellular telephone call, keep the call ongoing during the entire gaming event or session, and place the cellular telephone in a position such that the player and the remote gaming terminal are visible at all times. In such a situation, it could be very difficult for a player or group of players to defraud the system by allowing access to an underage or otherwise unauthorized player. Such a continuously fed visual image can then be reviewed manually or by an automated program on an ongoing or periodic basis.

While the review and approval of players based on visual image comparisons can certainly be made manually by live personnel employed by the remote gaming operator, it is also specifically contemplated that an automated facial recognition program or system could also be utilized in conjunction with the inventive player verification methods and systems disclosed herein. Such a facial recognition program or system may comprise one or more databases of past and present registered players, past and present banned players, known and suspected criminals, cheats and other notable individuals, as well as software that is capable of analyzing facial features, distinguishing individuals based on those features, and utilizing said databases to approve potential players as being correct, alert a system administrator when a determination is close but not convincing, and/or trigger an outright denial and possible alert or alarm sequence when a potential player is clearly not the player of record. Such facial recognition systems are well known in the art, with one example being the FACEIT® system by Visionics Corporation, which can be coupled with the Griffin G.O.L.D. casino security database system by Griffin Investigations. While such a system is typically designed for manual use, it is specifically contemplated that automated use be possible for clear cut cases, with manual intervention being an option for closer cases.

Other embodiments can include the presentation of player verification information or prompting on the actual game display at the remote game terminal, which of course takes place upon the first mode of communication, with a request that the player perform some act or give some indication that can be verified on the second mode of communication. For example, the primary game monitor may flash an alert that requires the player to raise a hand or look directly into the camera of a cellular telephone that is continuously transmitting visual images. The player would then be required to comply within a relatively short time frame, or player verification would be deemed negative and the gaming event or session would be terminated. Alternatively, it may be required that the transmitting camera, such as a cellular telephone camera, be positioned such that the player can be viewed and potentially positively identified, and also such that some portion of the playing screen, such as an upper right-hand corner, also be viewable by the camera. In this manner, an instant message flashed by the game in the upper right-hand corner should be immediately viewable upon display, such that no confirmation that such a submitted instant message has been displayed could similarly result in a negative player verification and a termination of the gaming event or session.

Figure 3:
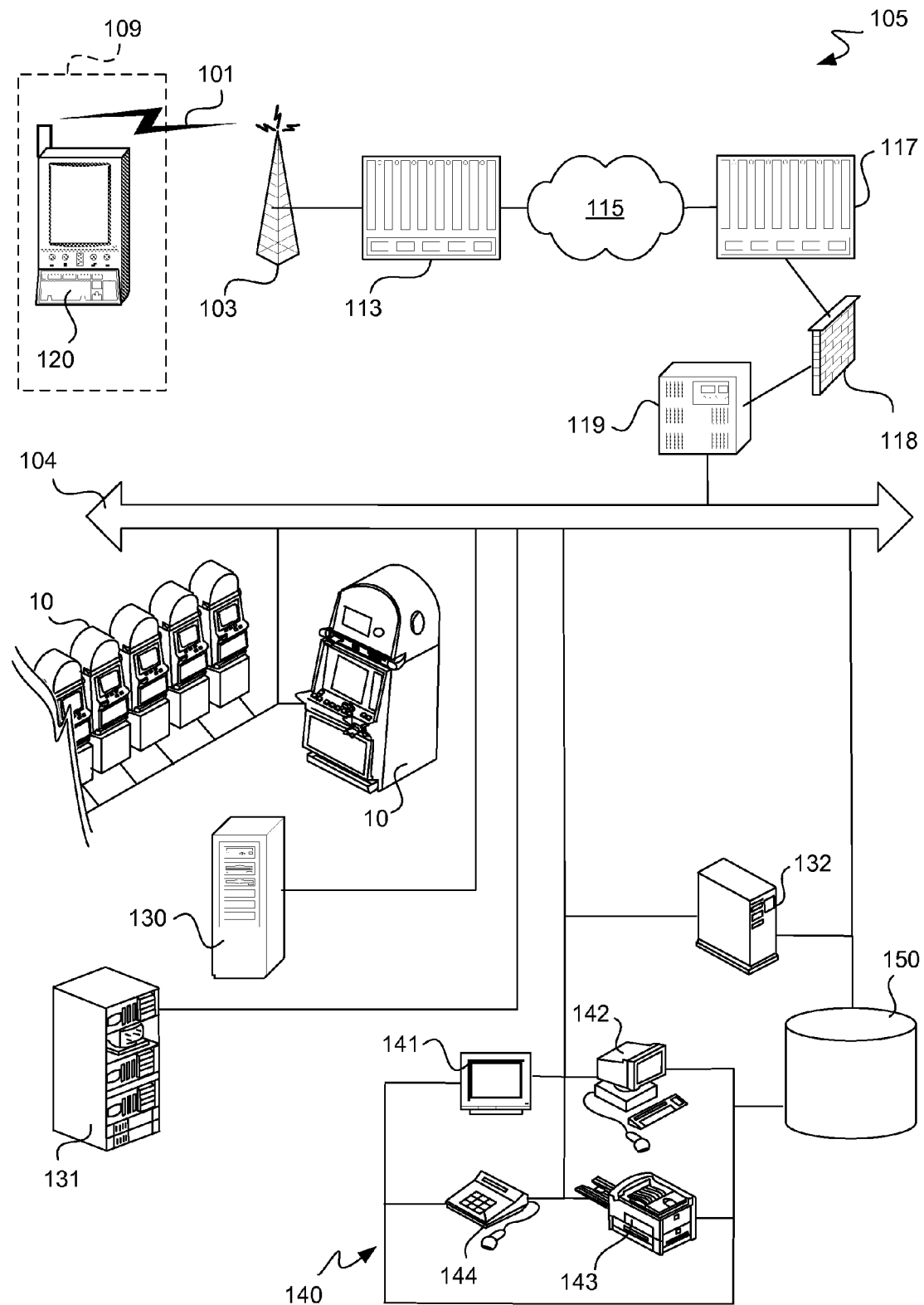
FIG. 3 illustrates a block diagram of an exemplary network infrastructure for providing a remote gaming system having an alternative remote gaming terminal according to one embodiment of the present invention.

Referring now to FIG. 3, a block diagram of an exemplary network infrastructure for providing a remote gaming system having an alternative remote gaming terminal according to one embodiment of the present invention is illustrated. Remote gaming system 105 is substantially similar to remote gaming system 100 as described previously, with the exception of the type of remote gaming terminal and the communication between the remote gaming terminal and the host side gaming network. Unlike the foregoing embodiment, remote gaming system 105 comprises one or more remote gaming terminals 109 that are significantly different from remote gaming terminal 110 from the previous embodiment. As shown, remote gaming terminal 109 comprises an integrated unit 120 capable of providing both remote game play and remote player verification. In a preferred embodiment, integrated unit 120 can be a comprehensive "all-in-one" PDA that is adapted to provide picture and MP3 taking and display capabilities, cellular phone service, and PC capabilities such that remote game play is possible, among other various features. Such an all-in-one PDA could be, for example, the Treo 600 smartphone, manufactured by Handspring, Inc. of Mountain View, Calif. Because such an integrated unit 120 provides both necessary functions in one package, only one mode of communication is used, although it is contemplated that such a unit could be adapted to use two separate modes of communication, if desired. Similar to the foregoing example, integrated unit 120 utilizes communication 101, which is processed by a single client LEC 113 (and received by a cellular reception unit 103, if applicable), and through a single network switching fabric 115. As can be seen, all other components of system 105 are identical or substantially similar to those of the foregoing embodiments.

Figure 4:
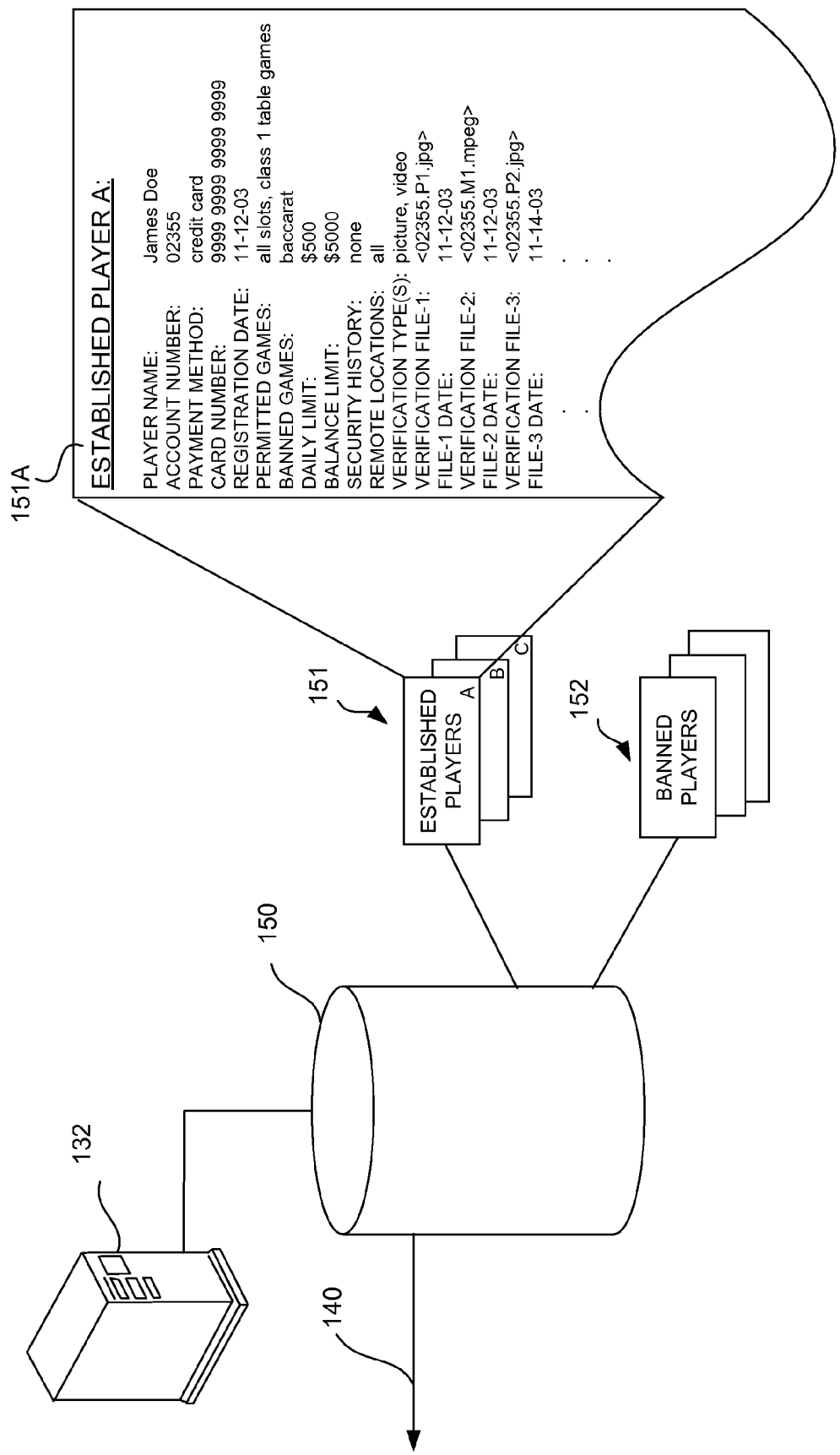
FIG. 4 illustrates an exemplary database containing associated data identifiers of various established and banned players according to one embodiment of the present invention.

Continuing on to FIG. 4, an exemplary database containing associated data identifiers of various established and banned players according to one embodiment of the present invention is illustrated. As similarly illustrated in FIGS. 2 and 3, database 150 is accessible to one or more servers, preferably including at least remote player verification server 132. Database 150 also preferably has a connection to a sub-network 140 of one or more peripheral devices. Contained within database 150 are numerous files or data sets with respect to many different past and present players within the remote gaming system, and preferably all such players are contained within database 150 or a collection of associated databases. Such files or data sets can be classified according to presently authorized and established player files 151 and banned player files 152, with such banned player files including files for unregistered players, banned players, known or suspected system cheats or thieves, and/or otherwise unauthorized or untrustworthy players. Although not necessary, the existence and maintenance of banned player files 152 can help to track improper or illegal attempts by unauthorized, underage or other undesirable players to play at a remote gaming terminal, and thus aid in the denial of gaming activities to such individuals and/or reporting of such attempts.

Each file or data set 151, 152 preferably contains information regarding the status of, identity of, and any pertinent restrictions with respect to past and present established and banned players, with database 150 preferably being adapted to store updated player information for each player over time as such information changes and/or as players access the remote gaming system in the future. Parameters for storing player information can vary widely, and are left up to the discretion of the system administrators. As shown in the illustrated example for established player file 151A, such information can include information for the player such as, for example, a player name, account number, payment method, payment identifier, registration date, permitted game types, banned game types, daily loss limit, cumulative balance limit, security history, permitted remote locations, and one or more player verification types and files, among others. Of course, other possible player informational items can be stored, and not every exemplary item listed here is necessary. Player verification types and files preferably include one or more forms of biometric information for the player, such as fingerprint or retinal data, a voice recording, a visual image or a short movie clip, among others.

Such information is preferably stored within a player file within the database, and can be retrieved and utilized by a remote player verification server 132 and/or a player verification program on another system server or actual gaming machine, if applicable, in order to determine not only whether the identity of a potential player is correct as claimed, but also whether that player is established and authorized at a particular remote location, for the requested game, and/or at the requested betting levels, among other factors. In the event that an established player defaults on a payment, accesses the remote gaming system from an improper location, attempts to aid in the access of an underage or otherwise unauthorized player, or acts in other ways deemed to be improper, then the file for such a player be appropriately updated by a system administrator to reflect such information, add restrictions, or alternatively reclassify the file as a banned player file. In such cases, player information and biometric or other verification file types can be maintained within the database in order to utilize such information in the event that unauthorized access may be attempted at some point in the future by that individual.

According to one embodiment of the present invention, the provided method or system, which preferably includes a network or like structure, involves the ongoing recordation of data or information as players repeatedly access the remote gaming system for ordinary remote game play. Such live data capture can be used immediately in the event that an alarm or alert needs to be triggered due to an improper access attempt or gaming behavior, and can also be stored in one or more databases, such as the database described above. In the event that one or more alarms or alerts are to be triggered in conjunction with use of the present remote player verification system, it is preferable that this system be at least somewhat intertwined with one or more elements of a security system or general law enforcement, such that action might be taken at the remote gaming terminal, if possible, with the recordation of data advantageously providing evidence of the illegal or improper activity.

Continuing live data capture of ordinary remote gaming events or sessions can be used for other purposes as well, such as to update or add to the player verification files for an established player. For example, the remote gaming system can be set to require a still visual image and a short video clip of a player at the time that a player first registers with the system. During future remote gaming events or sessions, one or more of the visual images or video clips used by the system to verify the player for that event or session can be stored to the player file for verification purposes in future gaming events or sessions. As a particular example of this possible embodiment, the established player file 151A as shown contains at least a still visual image and video clip that were submitted at the time of registration for that player, with another still visual image of the player added from a gaming session by that player two days later. Other visual images and/or video clips may also be stored for this player as well. In this manner, updated player verification files can provide not only updated images or other biometric information, but also a better sampling of the variations that might be experienced in such information for that player, which can result in better decisions as to whether a remote player attempting access is an established player as claimed.

Figure 5:
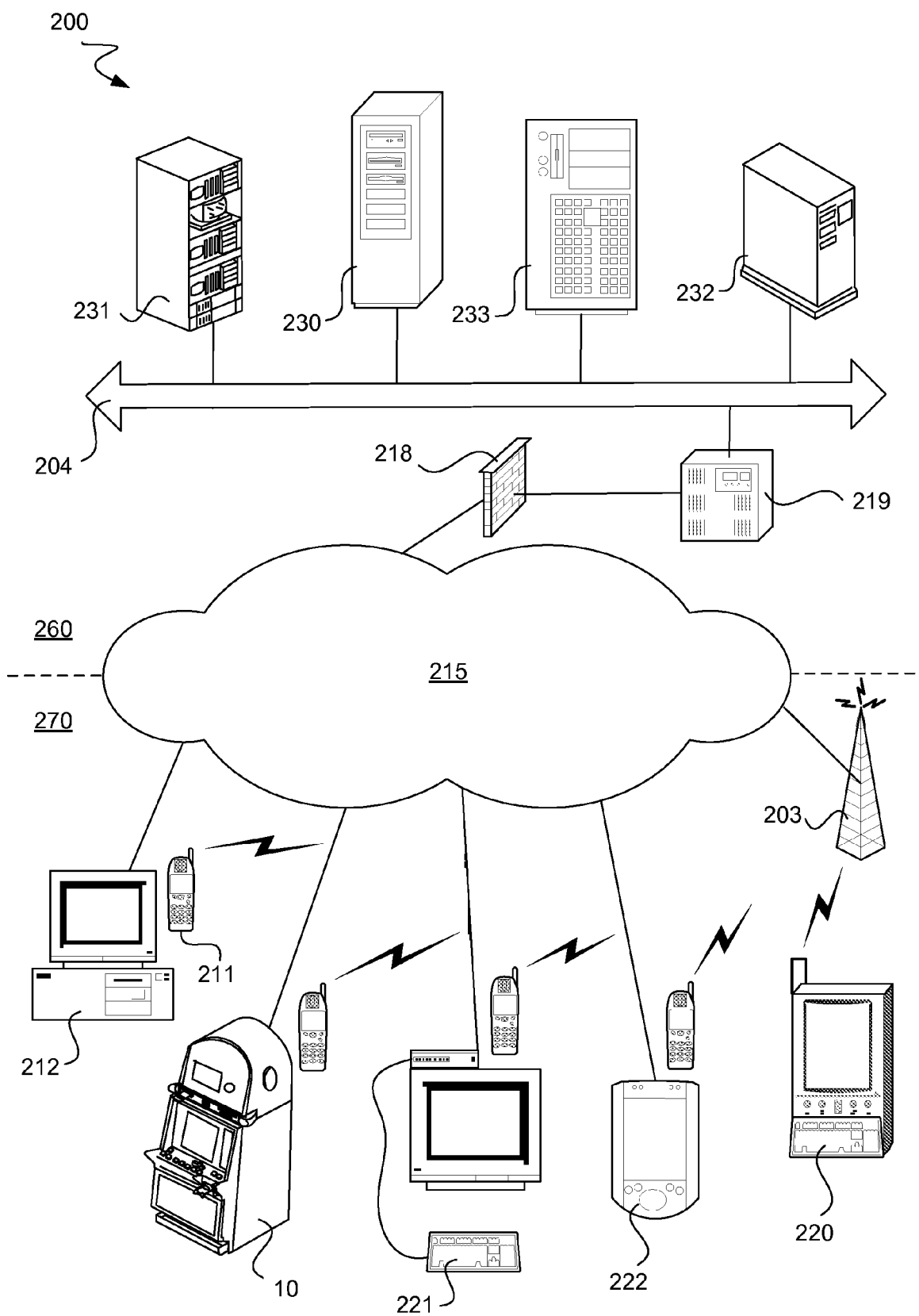
FIG. 5 illustrates a block diagram of various exemplary host-side and client-side objects within a remote gaming system according to one embodiment of the present invention.

Turning now to FIG. 5, a block diagram of various exemplary host-side and client-side objects within a remote gaming system according to one embodiment of the present invention is illustrated. Remote gaming system 200 is substantially similar in nature to and actually combines remote gaming systems 100 and 105 as previously illustrated and discussed, with several items added and others deleted for purposes of illustration. The primary or first mode of communication for providing gaming events to remote gaming terminals in system 200 is provided via a general network switching fabric 215, which can be, for example, a proprietary gaming network or the Internet, among other mediums. A host side 260 contains one or more items capable of operating and maintaining a remote gaming system, while a client side 270 contains one or more remote gaming terminals that can be at a variety of locations. Such remote gaming terminals can include, for example, a personal computer 212 and/or an all-in-one PDA 220, as in previously discussed embodiments, as well as an actual gaming machine 10, an iTV system 221 and/or an ordinary PDA 222, although other types of terminals are certainly possible. Each remote gaming terminal preferably includes at least one independent player identifier 211, which can be, for example, a cellular telephone, although other types of player identifiers are also possible. Of course, the all-in-one PDA 220 does not require a separate device that functions as an independent player identifier, as this type of terminal provides personal data for the player on its own, as described above.

Each independent player identifier 211 is adapted to communicate with the host side of the remote gaming system 200 through a second mode of communication that is separate from the primary or first mode of communication through which the remote gaming events are provided. Although such a second mode of communication may involve the use of separate addresses and/or channels on the general network switching fabric 215, it is preferable that this separate mode of communication be across a different medium altogether, such as a cellular telephone network, for example. As illustrated in the present example, each cellular telephone 211 in each remote gaming terminal is adapted to communicate with one or more cellular reception units 203, which typically involves the use of a client-side telephone service organization and associated equipment or LEC. An LEC is also typically present on the host-side of switching fabric 215, although both LECs are not shown again here for purposes of clarity. As in prior examples, communications are then typically forwarded to the host where they first encounter a firewall 218 and then a PBX 219 or other similar receiving device at the host before then being forwarded to the general bus 204 connecting most or all of the host-side network.

As in the previous example, the host-side network has a number of items, and can include one or more servers, such a general-purpose server 230, a GPS server and database 231, a player verification server 232, a general game server 233, and/or a specialized accounting server (not shown), among others. As illustrated here, a player database is assumed to be within the housing of player verification server 232, although it is entirely possible for this database to exist as a separate unit outside this server. As in the foregoing examples, other servers and components not listed can be included in such a host-side network, and not all components are necessary in order to practice the inventive methods and systems provided herein. For example, the existence of a general-purpose server 230 within the remote gaming system 200 is not necessary, but may be desirable based on the needs or preferences of a particular remote gaming operator or casino. Again, a third party verifier (not shown) may also be utilized, in which case one or more items may be remotely located from the casino or other gaming operator, with appropriate communication links from the switching fabric 215 to the third party and from the third party to the gaming operator.

Figure 6:
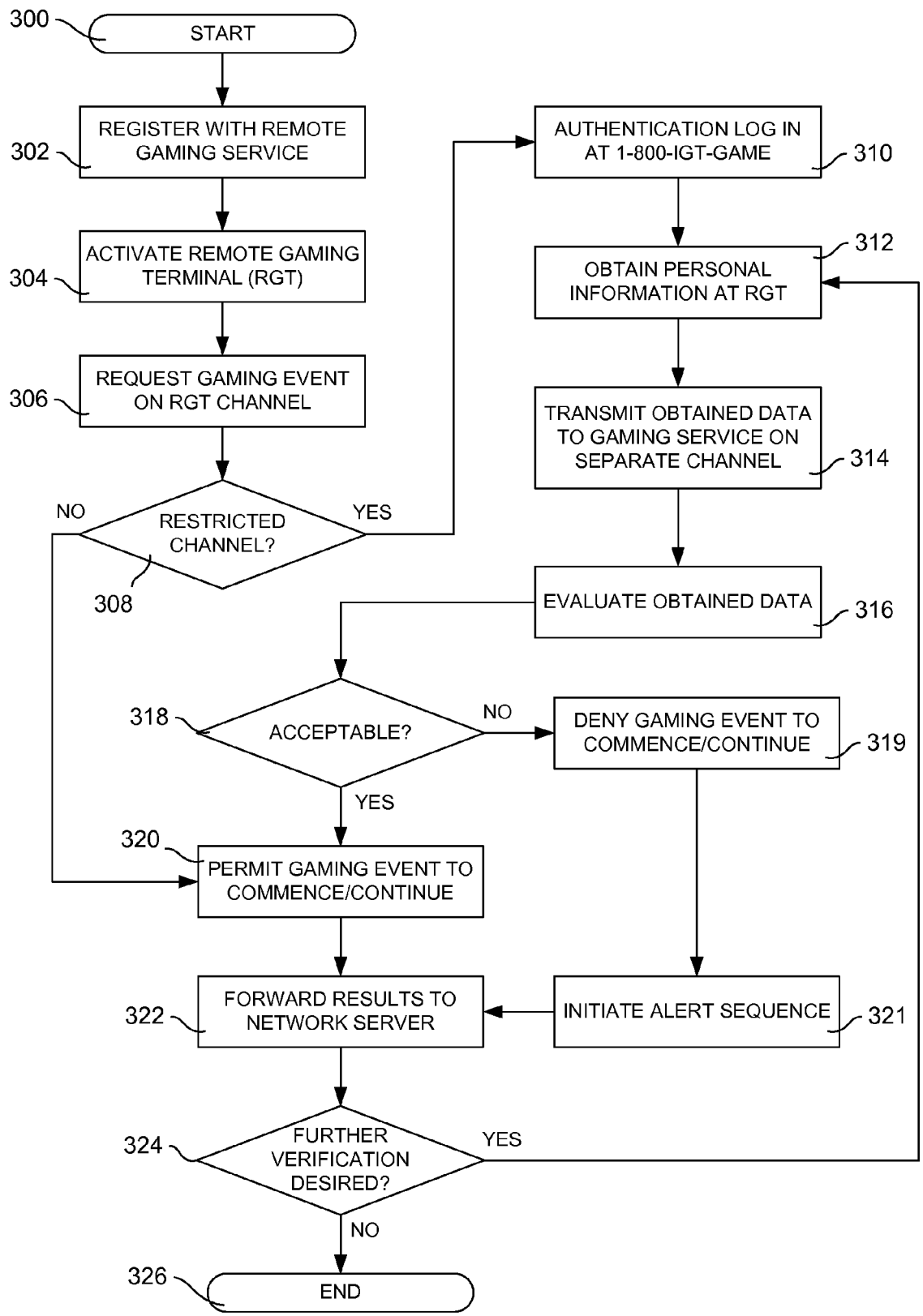
FIG. 6 illustrates a flowchart of one method of providing remote gaming and remote player verification according to one embodiment of the present invention.

Referring now to FIG. 6, a flowchart of one method of providing remote gaming and remote player verification according to one embodiment of the present invention is presented. After a start step 300, a first process step 302 involves a player registering with the remote gaming service. At some time after a successful registration at a process step 304, a remote gaming session is initiated on a first mode of communication by a prospective player activating a remote gaming terminal. Such an activation can involve, for example, accessing or turning on the remote gaming device in a hotel iTV unit, requesting a remotely downloadable game at a secondary gaming machine, or accessing a remote gaming program from a personal computer or PDA, among others. At the next process step 306, the prospective player requests access to a particular channel on the remote gaming terminal, or requests a specific gaming event on an already activated channel. A subsequent decision step 308 then involves a decision as to whether the requested channel or gaming event is restricted. While restricted channels or events can generally include all games involving a player wager, non-restricted channels and events can include, for example, those involving suitable recreational video games.

If such a requested channel or gaming event is deemed to be restricted, then the player verification method proceeds to a process step 310. Should such a channel or gaming event be non-restricted, however, then the charted method becomes relatively simple, as the method proceeds to a process step 320, where the requested channel or event can be accessed, with the requested gaming event commencing as requested. Results could then be forwarded to the gaming network at a process step 322 if necessary, and presumably no further verification would be needed or desired at decision step 324. The process would then end at end step 326.

Should the requested channel or gaming event be restricted, then player verification is necessary, and the player is preferably prompted or otherwise required to authenticate himself or herself at a process step 310. Such an authentication step can take place on the first mode of communication at the remote gaming terminal itself, but preferably involves establishing a second mode of communication not only for authenticating that the prospective player has an established account, but also for verifying that the identity of the prospective player is that of the player on the established account. In the event that authentication takes place on the first mode of communication at the remote gaming terminal itself, then a second mode of communication must be established at some point before process step 314 for player verification purposes in any event.

One example of performing such an authentication step can involve the placement of a telephone call through a toll-free number to the gaming operator or other third party player verifier or authorization center. Such a toll-free telephone number could be, for example, 1-800-IGT-GAME, although other numbers, gaming operators and/or managing entities are also possible. In some instances, an individual gaming operator may desire to authenticate or verify players on its own, especially where the gaming operator is large and can undertake an extensive remote player authentication program and system. In many instances, however, gaming operators may wish to use a third party to provide remote player verification or authentication. Such a third party remote player verifier or authentication center could implement a system similar to the Griffin G.O.L.D. casino security database system by Griffin Investigations, which uses the FACEIT® system by Visionics Corporation, whereby data for known or registered users is stored in a huge database for purposes of future authorization. Such an endeavor by a third party authenticator would be particularly viable where multiple vendors used the system.

In such a system, the telephone call or other relevant communication for authenticating the player would be made to the third party verifier or authentication center, whereupon a determination could be made, and an affirmative verification or negative denial would then be forwarded to the gaming operator as to whether the requested gaming event has been authorized to commence or continue. Such a "central clearinghouse" for remote player verification could be formed by a separate private or public entity, to which individual gaming operators might subscribe for periodic and/or per use service. For instance, a state Gaming Control Board can run such a system adapted to issue authorization and/or denial signals regarding remote gaming players, as well as maintain a player database for such purposes. While it may be preferable for a public or government agency to administer such a remote player verification system, it is thought that the ability to profit from numerous separate subscribers while maintaining a huge and growing database of player files would enable a private organization to run such a system. In addition, while it might be possible to have one conglomerate world-wide system, practical implementations of such third party systems on a large scale basis might likely result in one large system per country, state and/or gaming jurisdiction. Such systems could possibly reference each other or share in access to the same database or databases.

Of course, where a third party authentication center is used, the gaming machines and/or network of the gaming operator will still need to verify whether a remote player is eligible or authorized to play a game remotely. Rather than incorporate a substantial player verification program on such machines or network or elsewhere at the gaming operator for such verification purposes, the affected machines and/or network would only need to verify whether a signal or other relayed information from the third party authentication center contains a positive or negative signal with respect to authorizing play for a given remote player (i.e., "player approved" or "player denied"). In such cases, the verification step at the gaming machine or network of the gaming operator is hence relatively simple, and typically involves merely verifying that the signal from the third party authorization center is or remains "player approved." Accordingly, any player verification program on the relative gaming machine or network would also be relatively simple, as it may only be necessary for such a program simply to receive, interpret and act upon a signal from the third party verifier or authorization center, where one or more substantial player verification programs are presumably implemented.

At a subsequent process step 312, personal information is obtained from the prospective player at the remote gaming terminal. Such person information, as discussed previously, can include fingerprint, retinal or voice information, among other personal information types, but preferably involves one or more visual images of the prospective player. In a particularly preferred embodiment, the obtaining of personal information involves a cellular phone at the remote gaming terminal taking one or more pictures of the prospective player. At the next process step 314, this obtained personal information or data is then transmitted to the remote gaming service on a separate channel from the primary remote gaming channel. In the preferred embodiment, this involves sending the pictures taken by the cellular phone to the remote gaming service via a cellular call placed by that phone. At the next process step 316, the obtained information or data is then evaluated by the remote gaming service, which evaluation can be done manually or via automated programs, as previously described.

The next process step 318 is a decision step where it is determined whether the prospective player is verified as an acceptable player. Such a verification may be relatively crude, in that only underage gaming is targeted with identity fraud being a potential problem, or may be refined, in that a determination is made that the prospective player is likely to be the person who he or she is claiming to be. Should the decision be that this person is acceptable, then the gaming event is permitted to commence at a subsequent process step 320. In such a case, results of the gaming event are then subsequently forwarded to the appropriate network server, such as an accounting server at the next process step 322, and a decision step as to whether further player verification is desired is arrived at a subsequent decision step 324. Should further player verification be desired, then process steps 312 through 324 are repeated as necessary, with the method proceeding to an end step 326 if further player verification is not desired.

In the event that the evaluation of player data results in an unacceptable player verification at decision step 318, however, then the method proceeds to a process step 319, where a denial of the requested gaming event from commencing or continuing occurs. At a subsequent process step 321 an appropriate alert sequence can be initiated, whereby the denial and any forwarded personal information can be recorded and appropriate security and/or law enforcement personnel can be notified, if desired. The method then returns to the primary process branch at process step 322, where such results are then forwarded to the appropriate network server for recording and/or additional processing.

It is worth noting that additional factors beyond the verification of current personal information can be involved at the "evaluate obtained data step" 316 and the accompanying "acceptable?" decision step 318. Such additional factors can include, for example, whether the player is banned from certain games, whether the player has exceeded a daily loss limit or maximum balance limit, or whether the player is the subject of any security inquiries or other potential problems. Additional factors may likewise be added here as desired for any particular remote gaming operator. In any such case, it may be possible that the response to the decision step 318 is a "NO," even where the identity of the player is verified as being proper.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

The invention claimed is:

1. A method of providing player verification for a remote gaming terminal, the method comprising:
   providing one or more gaming events from one or more servers, said one or more servers operated by a gaming operator, to said remote gaming terminal via a first communication link;
   establishing one or more criteria for verifying the identity or eligibility of a player, wherein said one or more criteria includes an appropriate age of said player;
   receiving a request from said remote gaming terminal to participate in at least one particular gaming event selected from said one or more gaming events;
   determining that player verification is required;
   receiving, at said one or more servers, when it is determined that player verification is required, personal information regarding a specific player from a verification device, wherein said verification device is independent from said remote gaming terminal such that said verification device is configured to be used in the same location as said remote gaming terminal, wherein said personal information is received via a second communication link during or immediately prior to the play of a wager-based game at said remote gaming terminal, wherein said second communication link is different than said first communication link and uses a different communication medium than said first communication link, said personal information including at least two of the following:
   a) one or more visual images of the specific player,
   b) a current geographic location of the specific player, and
   c) one or more voice samples of the specific player;
   transmitting said personal information from said one or more servers to a player authentication system operated by a third party, said third party being a separate entity from said gaming operator, wherein said one or more servers are located at a different location from said authentication system;
   receiving verification at said one or more servers from said player authentication system when said personal information regarding said specific player is acceptable; and
   permitting, using said one or more servers, when said personal information is verified, said at least one particular gaming event to commence or continue on said remote gaming terminal.

2. The method of claim 1, wherein said remote gaming terminal comprises a gaming machine.

3. The method of claim 1, further including the step of:
   associating said request with a particular player account.

4. The method of claim 1, further including the subsequently repeated steps of:

receiving, at said one or more servers, personal information regarding said specific player from said verification device, wherein said personal information is received via said second communication link;

transmitting said personal information from said one or more servers to said player authentication system;

receiving verification at said one or more servers from said player authentication system when said personal information regarding said specific player is acceptable; and permitting, using said one or more servers, when said personal information is verified, said at least one particular gaming event to continue on said remote gaming terminal.

5. The method of claim 4, wherein said subsequently repeated steps are continuously performed.

6. The method of claim 4, wherein said subsequently repeated steps are performed at regular periodic intervals.

7. The method of claim 4, wherein said subsequently repeated steps are performed at random intervals.

8. The method of claim 1, wherein at least one of said one or more visual images of the specific player is a digitized picture.

9. The method of claim 1, wherein at least one of said one or more visual images of the specific player is a visual image created after said receiving said request from said remote gaming terminal.

10. The method of claim 9, wherein at least one of said one or more visual images of the specific player is a live visual image.

11. The method of claim 1, wherein said current geographic location of the specific player is determined by a global positioning system.

12. The method of claim 1, wherein said current geographic location of the specific player is determined by a cellular telephone network.

13. The method of claim 1, wherein said second communication link comprises a cellular telephone call.

14. The method of claim 13, wherein said one or more visual images of the specific player are received via said cellular telephone call.

15. The method of claim 14, wherein at least one of said one or more visual images of the player is taken by a camera built into a cellular phone used for said cellular telephone call.

16. The method of claim 15, further including the subsequently repeated steps of:

receiving, at said one or more servers, an updated visual image of the specific player via a cellular telephone call;

transmitting said updated visual image from said one or more servers to said player authentication system;

receiving verification at said one or more servers from said player authentication system when said updated visual image is acceptable; and permitting, using said one or more servers, when said updated visual image is verified, said at least one particular gaming event to continue on said remote gaming terminal.

17. A remote gaming system configured for accepting wagers and granting monetary awards at a remote gaming terminal, comprising:

an electronic device configured to provide and to control one or more gaming events, the electronic device configured to be operated by a gaming operator;

a logic device configured to determine when player verification is required;

a first communication device configured to communicate with said remote gaming terminal via a first communication link and to provide at least one of said one or more gaming events at said remote gaming terminal;

a second communication device configured to communicate with said remote gaming terminal via a second communication link, said second communication link configured to use a different communication medium than said first communication link, said second communication link being different than said first communication link, and said second communication link configured to obtain personal information regarding a specific player at said remote gaming terminal during or immediately prior to the play of a wager-based game at said remote gaming terminal, said personal information regarding said specific player including at least two of the following:

a) one or more visual images of the specific player, b) a current geographic location of the specific player, and c) one or more voice samples of the specific player; and a player verification program configured to verify whether said personal information regarding said specific player is acceptable according to one or more criteria for verifying the identity or eligibility of a player, wherein said one or more criteria includes an appropriate age of said player, wherein said player verification program is configured to receive an authorization signal from a player authentication system configured to be operated by a third party, the third party being a separate entity from said gaming operator, wherein said electronic device is located at a different location from said authentication system.

18. The remote gaming system of claim 17, wherein said electronic device comprises a gaming server.

19. The remote gaming system of claim 17, wherein said electronic device comprises a gaming machine having a master gaming controller.

20. The remote gaming system of claim 17, wherein said electronic device is configured to deny the initiation or continuation of a particular gaming event when said player verification program determines that said personal information is not acceptable.

21. The remote gaming system of claim 17, wherein said player verification program is configured to verify multiple submissions of said personal information regarding said specific player during the progress of or between one or more gaming events.

22. The remote gaming system of claim 21, wherein said player verification program is configured to require continuous additional submissions of said personal information regarding said specific player during the progress of or between one or more gaming events.

23. The remote gaming system of claim 17, wherein said current geographic location of the specific player is configured to be determined by a global positioning system.

24. The remote gaming system of claim 17, wherein said current geographic location of the specific player is configured to be determined by a cellular telephone network.

25. The remote gaming system of claim 17, wherein said second communication link comprises a cellular telephone call.

26. The remote gaming system of claim 25, wherein said one or more visual images of the specific player are configured to be received via said cellular telephone call and are configured to be taken by a camera built into the cellular phone used for the cellular telephone call.

27. A remote gaming terminal player verification system, comprising:

at least one computer server, said at least one computer server configured to be operated by a gaming operator, said at least one computer server having a player verification program configured to verify when personal information regarding a specific player obtained at a remote gaming terminal is acceptable according to one or more criteria for verifying the identity or eligibility of a player, wherein said one or more criteria includes an appropriate age of said player, wherein said player verification program is configured to receive an authorization signal from a player authentication system configured to be operated by a third party, the third party being a separate entity from said gaming operator, wherein said at least one computer server is located at a different location from said authentication system;

a logic device configured to determine when player verification is required;

one or more gaming devices configured to communicate with said at least one computer server, wherein at least one of said one or more gaming devices is further configured to provide and control one or more gaming events;

a first communication device, said first communication device configured to communicate with said at least one computer server via a first communication link and to provide at least one of said one or more gaming events at said remote gaming terminal; and a second communication device, said second communication device configured to communicate with said at least one computer server via a second communication link and to obtain personal information regarding a specific player at said remote gaming terminal during or immediately prior to the play of a wager-based game at said remote gaming terminal, said second communication link configured to use a different communication medium than said first communication link, said second communication link being different than said first communication link, and said personal information regarding said specific player including at least two of the following:
   a) one or more visual images of the specific player,
   b) a current geographic location of the specific player, and
   c) one or more voice samples of the specific player.

28. The remote gaming terminal player verification system of claim 27, wherein at least one of said one or more gaming devices comprises a gaming machine.

29. The remote gaming terminal player verification system of claim 27, wherein said at least one computer server is configured to deny the initiation or continuation of a particular gaming event when said player verification program determines that said personal information is not acceptable.

30. The remote gaming terminal player verification system of claim 27, wherein said player verification program is configured to verify multiple submissions of said personal information regarding said specific player during the progress of or between one or more gaming events.

31. The remote gaming terminal player verification system of claim 30, wherein said player verification program is configured to require continuous additional submissions of personal information regarding said specific player during the progress of or between one or more gaming events.

32. The remote gaming terminal player verification system of claim 27, wherein said current geographic location of the specific player is configured to be determined by a global positioning system.

33. The remote gaming terminal player verification system of claim 27, wherein said current geographic location of the specific player is configured to be determined by a cellular telephone network.

34. The remote gaming terminal player verification system of claim 27, wherein said second communication link comprises a cellular telephone call.

35. The remote gaming terminal player verification system of claim 34, wherein said one or more visual images of the specific player are configured to be received via said cellular telephone call and are configured to be taken by a camera built into the cellular phone used for the cellular telephone call.

36. The remote gaming terminal player verification system of claim 27, further comprising:
   at least one database, said at least one database containing specific personal information data with respect to a plurality of players.

37. The remote gaming terminal player verification system of claim 36, wherein said player verification program is configured to compare personal information regarding a specific player obtained at said remote gaming terminal to specific personal information data corresponding to that specific player that is contained within said at least one database.

38. The remote gaming terminal player verification system of claim 27, wherein access to a gaming event is denied or restricted with respect to said specific player due to an implemented harm minimization measure.

39. The remote gaming terminal player verification system of claim 27, wherein said system is configured to provide one or more harm minimization measures at said remote gaming terminal.

* * * * *